United States Patent
Skoglund et al.

(10) Patent No.: US 11,511,530 B2
(45) Date of Patent: Nov. 29, 2022

(54) CARD SUBSTRATE LAMINATING DEVICE

(71) Applicant: ASSA ABLOY AB, Stockholm (SE)

(72) Inventors: John Skoglund, Prior Lake, MN (US); Michael Woizeschke, Shakopee, MN (US); Ted Hoffman, Eden Prairie, MN (US); Tanya Snyder, Edina, MN (US)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 16/884,754

(22) Filed: May 27, 2020

(65) Prior Publication Data

US 2020/0282716 A1    Sep. 10, 2020

Related U.S. Application Data

(63) Continuation of application No. 15/761,125, filed as application No. PCT/IB2015/057561 on Oct. 2, 2015, now Pat. No. 10,688,764.

(51) Int. Cl.
*B32B 37/00* (2006.01)
*B29C 65/00* (2006.01)
(Continued)

(52) U.S. Cl.
CPC ...... *B32B 37/0053* (2013.01); *B29C 65/7802* (2013.01); *B29C 66/83411* (2013.01);
(Continued)

(58) Field of Classification Search
CPC ............ C09K 11/7792; B32B 2309/02; B32B 2425/00; B32B 37/0053; B32B 37/025; B32B 37/065; B32B 37/226
See application file for complete search history.

(56) References Cited

U.S. PATENT DOCUMENTS 3,027,285 A  *  3/1962   Eisner .................. B32B 37/185
                                                                  219/486
3,312,979 A       4/1967   Della et al.
(Continued)

FOREIGN PATENT DOCUMENTS

CN         102956510 A        3/2013
CN         107073995 A        8/2017
(Continued)

OTHER PUBLICATIONS

"English translation of CN107073995", 15 pgs.
(Continued)

*Primary Examiner* — Sonya M Sengupta
(74) *Attorney, Agent, or Firm* — Schwegman Lundberg & Woessner, P.A.

(57) ABSTRACT

A card substrate laminating device including a transfer roller configured to heat a portion of a transfer layer of a transfer ribbon and transfer the portion of the transfer layer from a carrier layer of the transfer ribbon to a surface of a card substrate. The transfer roller includes a diameter of less than 0.537 inches and a compliant exterior surface layer or coating. The compliant exterior surface layer or coating can include silicon rubber. The compliant exterior surface layer or coating can be approximately 0.020 inches thick. An internal heating element is configured to heat the transfer roller from an ambient temperature to a laminating temperature, at which laminating operations are performed, within 40 seconds.

17 Claims, 4 Drawing Sheets

(51) Int. Cl.
*B29C 65/78* (2006.01)
*B32B 37/06* (2006.01)
*B32B 37/22* (2006.01)
*C09K 11/77* (2006.01)

(52) U.S. Cl.
CPC .......... *B32B 37/025* (2013.01); *B32B 37/065* (2013.01); *B32B 37/226* (2013.01); *B29C 66/834* (2013.01); *B32B 2309/02* (2013.01); *B32B 2425/00* (2013.01); *C09K 11/7792* (2013.01); *Y10T 156/1741* (2015.01); *Y10T 156/1744* (2015.01)

(56) References Cited

U.S. PATENT DOCUMENTS

| | | | |
|---|---|---|---|
| 3,616,020 A * | 10/1971 | Whelan | B29C 48/9145 427/209 |
| 3,826,701 A * | 7/1974 | Miller | B29C 66/1122 156/308.2 |
| 3,975,707 A | 8/1976 | Ito et al. | |
| 4,738,555 A | 4/1988 | Nagashima | |
| 4,851,069 A * | 7/1989 | Packard | B32B 29/04 428/326 |
| 4,865,675 A * | 9/1989 | Yamamoto | B32B 37/0053 264/173.1 |
| RE33,260 E | 7/1990 | Stephenson | |
| 5,011,707 A | 4/1991 | Schell et al. | |
| 5,220,343 A | 6/1993 | Takanashi et al. | |
| 5,247,314 A | 9/1993 | Stephenson | |
| 5,259,680 A | 11/1993 | Shimizu et al. | |
| 5,410,642 A | 4/1995 | Hakamatsuka et al. | |
| 5,466,075 A | 11/1995 | Kouzai et al. | |
| 5,478,157 A | 12/1995 | Kohno et al. | |
| 5,608,507 A | 3/1997 | Nguyen | |
| 5,634,731 A | 6/1997 | Kita et al. | |
| 5,751,601 A | 5/1998 | Tang et al. | |
| 5,990,918 A | 11/1999 | Baxendale | |
| 6,071,024 A | 6/2000 | Chi-ming et al. | |
| 6,097,415 A * | 8/2000 | Kita | B41J 2/32 347/213 |
| 6,106,910 A | 8/2000 | Tan et al. | |
| 6,261,912 B1 | 7/2001 | Hsiao et al. | |
| 6,264,296 B1 | 7/2001 | Cummins et al. | |
| 6,284,708 B1 | 9/2001 | Oshima et al. | |
| 6,396,526 B1 | 5/2002 | Sung et al. | |
| 6,504,561 B1 | 1/2003 | Yih | |
| 6,509,919 B1 | 1/2003 | Tehranchi et al. | |
| 6,509,920 B2 | 1/2003 | Sung et al. | |
| 6,554,044 B2 | 4/2003 | Hoffman et al. | |
| 6,618,067 B2 | 9/2003 | Yung | |
| 6,773,772 B2 | 8/2004 | Shinozaki et al. | |
| 6,803,936 B2 | 10/2004 | Odaka et al. | |
| 6,876,374 B2 | 4/2005 | Miyazaki | |
| 7,162,035 B1 | 1/2007 | Durst et al. | |
| 7,206,096 B1 | 4/2007 | Sasaki et al. | |
| 7,223,031 B2 | 5/2007 | Countryman et al. | |
| 7,639,269 B2 | 12/2009 | Mizukami et al. | |
| 7,767,050 B2 | 8/2010 | Meier et al. | |
| 7,870,824 B2 | 1/2011 | Sadeck et al. | |
| 8,743,163 B2 * | 6/2014 | Harris | B41M 5/0011 347/171 |
| 8,956,490 B1 * | 2/2015 | Karst | B44C 1/1712 156/247 |
| 9,802,398 B2 | 10/2017 | Rieck et al. | |
| 9,821,548 B2 | 11/2017 | Rieck | |
| 10,688,764 B2 | 6/2020 | Skoglund et al. | |
| 2002/0101497 A1 | 8/2002 | Kwasny et al. | |
| 2005/0078998 A1 | 4/2005 | Lien et al. | |
| 2005/0199778 A1 | 9/2005 | Kadowaki et al. | |
| 2005/0269033 A1 | 12/2005 | Kohira et al. | |
| 2008/0000204 A1 | 1/2008 | Turvey et al. | |
| 2009/0145537 A1 | 6/2009 | Suzuki | |
| 2013/0032288 A1 * | 2/2013 | Lien | B32B 37/0046 156/60 |
| 2016/0318291 A1 * | 11/2016 | Miyake | B32B 37/0053 |
| 2018/0257358 A1 | 9/2018 | Skoglund et al. | |

FOREIGN PATENT DOCUMENTS

| | | |
|---|---|---|
| DE | 102011080929 A1 | 2/2013 |
| EP | 0153693 B1 | 5/1989 |
| EP | 0537880 A1 | 4/1993 |
| EP | 0593303 A2 | 4/1994 |
| EP | 1188570 A2 | 3/2002 |
| EP | 1382456 A1 | 1/2004 |
| EP | 1388428 A1 | 2/2004 |
| EP | 2018275 A1 | 1/2009 |
| EP | 2521652 A2 | 11/2012 |
| EP | 2879877 A1 | 6/2015 |
| EP | 3356144 A1 | 8/2018 |
| JP | 2001158118 A | 6/2001 |
| JP | 2002007993 | 1/2002 |
| JP | 2017527457 A | 9/2017 |
| KR | 20170044083 A | 4/2017 |
| WO | WO-2007122441 A1 | 11/2007 |
| WO | WO-2007135403 A1 | 11/2007 |
| WO | WO-2008108904 A1 | 9/2008 |
| WO | WO-2008108925 A1 | 9/2008 |
| WO | WO-2008118424 A1 | 10/2008 |
| WO | WO-2011085174 A3 | 9/2011 |
| WO | WO-2014022088 A1 | 2/2014 |
| WO | WO-2015191058 A1 | 12/2015 |
| WO | WO-2017055897 A1 | 4/2017 |

OTHER PUBLICATIONS

"English translation of EP0153693", 12 pgs.
"U.S. Appl. No. 15/761,125, Examiner Interview Summary dated Jan. 16, 2020", 3 pgs.
"U.S. Appl. No. 15/761,125, Final Office Action dated Oct. 11, 2019", 9 pgs.
"U.S. Appl. No. 15/761,125, Non Final Office Action dated May 3, 2019", 10 pgs.
"U.S. Appl. No. 15/761,125, Notice of Allowance dated Feb. 20, 2020", 9 pgs.
"U.S. Appl. No. 15/761,125, Preliminary Amendment filed Mar. 19, 2018", 7 pgs.
"U.S. Appl. No. 15/761,125, Response filed Jan. 13, 2020 to Final Office Action dated Oct. 11, 2019", 12 pgs.
"U.S. Appl. No. 15/761,125, Response filed Aug. 1, 2019 to Non-Final Office Action dated May 3, 2019", 10 pgs.
"Chinese Application Serial No. 201580083562.X, Office Action dated Aug. 23, 2019", w/ English Translation, 15 pgs.
"European Application Serial No. 11706968.2, Communication of a notice of opposition dated Dec. 4, 2014", 1 pg.
"European Application Serial No. 11706968.2, Communication of a notice of opposition dated Dec. 11, 2014", 1 pg.
"European Application Serial No. 13740482.8, Communication pursuant to Rules 161(1) and 162 EPC dated Apr. 24, 2015", 2 pgs.
"European Application Serial No. 15779026.2, Response filed Mar. 9, 2020 to Communication Pursuant to Article 94(3) EPC dated Nov. 20, 2019", 16 pgs.
"International Application Serial No. PCT/IB2015/057561, International Search Report dated Jun. 10, 2016", 4 pgs.
"International Application Serial No. PCT/IB2015/057561, Written Opinion dated Jun. 10, 2016", 5 pgs.
"International Application Serial No. PCT/US2011/020483, International Preliminary Report on Patentability dated Jul. 19, 2012", 8 pgs.
"International Application Serial No. PCT/US2011/020483, International Search Report dated Jul. 22, 2011", 6 pgs.
"International Application Serial No. PCT/US2011/020483, Written Opinion dated Jul. 22, 2011", 6 pgs.
"International Application Serial No. PCT/US2013/050607, International Search Report dated Nov. 4, 2013", 3 pgs.

(56) References Cited

OTHER PUBLICATIONS

"International Application Serial No. PCT/US2013/050607, Written Opinion dated Nov. 4, 2013", 4 pgs.

"International Application Serial No. PCT/US2014/041852, International Search Report dated Mar. 19, 2015", 4 pgs.

"International Application Serial No. PCT/US2014/041852, Written Opinion dated Mar. 19, 2015", 4 pgs.

"What Wavelength Goes With a Color", by the Atmospheric Science Data Center, [Online] Retrieved from the Internet on May 31, 2006: <URL: http://eosweb.larc.nasa.gov/EDDOCS/Wavelengths_for_Colors.html>, 3 pgs.

Wanyou, Tang, et al., "Postpress Processing Technology", China Light Industry Press—Not in English; p. 149, [Online]. [Accessed Jul. 26, 2019] Retrieved from the Internet: <URL: http://img.duxiu.com/n/jpgfs/book/base/11936794/ce638e393f7b43e4b661fba20072cb44/13ced2b01470dce020298ec50fa4bbc0.shtml?uf=1&t=1>, (Mar. 31, 2008), 3 pgs.

"Chinese Application Serial No. 201580083562.X, Office Action dated May 27, 2020", w/ English Translation, 8 pgs.

"Chinese Application Serial No. 201580083562.X, Response filed Aug. 11, 2020 to Office Action dated May 27, 2020", w/o English Translation, 24 pgs.

"Chinese Application Serial No. 201580083562.X, Response filed Dec. 23, 2019 to Office Action dated Aug. 23, 2019", w/o English Translation, 16 pgs.

"European Application Serial No. 15779026.2, Communication Pursuant to Article 94(3) EPC dated May 11, 2020", 3 pgs.

"European Application Serial No. 15779026.2, Communication Pursuant to Article 94(3) EPC dated Nov. 20, 2019", 3 pgs.

"International Application Serial No. PCT/IB2015/057561, International Preliminary Report on Patentability dated Apr. 12, 2018", 7 pgs.

"Korean Application Serial No. 10-2018-7012408, Response filed Sep. 29, 2021 to Office Action dated Aug. 30, 2021", w/ English Claims, 21 pgs.

"Korean Application Serial No. 10-2018-7012408, Notice of Preliminary Rejection dated Aug. 30, 2021", w/ English Translation, 15 pgs.

"Korean Application Serial No. 10-2018-7012408, Notice of Final Rejection dated Mar. 23, 2022", w/ English Translation, 10 pgs.

"European Application Serial No. 15779026.2, Response filed Jun. 20, 2020 to Communication Pursuant to Article 94(3) EPC dated May 11, 2020", 11 pgs.

\* cited by examiner

CARD SUBSTRATE LAMINATING DEVICE

CROSS-REFERENCE TO RELATED APPLICATIONS

The present application is a continuation of U.S. patent application Ser. No. 15/761,125, filed Mar. 19, 2018, which is a national stage application under 35 U.S.C. § 371 of International Application No. PCT/IB2015/057561, filed Oct. 2, 2015, each of which is hereby incorporated herein by reference in its entirety.

BACKGROUND

Credentials include identification cards, driver's licenses, passports, and other documents. Such credentials are formed from credential or card substrates including paper substrates, plastic substrates, cards, and other materials. Such credentials generally include printed information, such as a photo, account numbers, identification numbers, and other personal information. Credentials can also include data that is encoded in a smartcard chip, a magnetic stripe, or a barcode, for example.

Credential production devices process credential substrates by performing at least one processing step in forming a final credential product. A card substrate laminating device performs a transfer or laminating process using a transfer ribbon. The transfer ribbon generally includes a continuous web liner or carrier layer to which a transfer layer is removably attached. The card substrate laminating device bonds the transfer layer to a surface of a card substrate using a heated roller.

The transfer layer may generally be one of two types: a patch laminate, or a fracturable thin film laminate. The patch laminate generally includes a pre-cut polyester film that has been coated with a thermal adhesive on one side. The pre-cut patch is attached to the liner with the thermal adhesive side exposed and available for lamination to the substrate. The heated roller is used to heat the patch to activate the adhesive, and press the patch to a surface of the card substrate to bond the patch onto the surface. The carrier layer is then removed from the bonded patch to complete the lamination process.

Fracturable thin film laminates are generally continuous resinous materials that have been coated onto the carrier layer. The side of the thin film laminate that is not attached to the carrier layer is generally coated with a thermal adhesive, which is used to create a bond between the thin film laminate and the surface of the card substrate. The heated roller of the laminating device is used to activate the adhesive and press the thin film laminate against the surface of the substrate to bond the thin film laminate to the surface. The removal of the carrier layer from the bonded thin film laminate completes the lamination process. The thin film laminate provides protection to the surface of the card.

The transfer layer may also operate as a print intermediate, on which an image may be printed in a reverse-image printing process. In the reverse-image printing process, an image is printed to the exposed side of the transfer layer (i.e., patch laminate or thin film laminate). Next, the image on the transfer layer is registered with the card substrate. The heated roller is used to activate the adhesive on the imaged transfer layer causing the imaged transfer layer to bond to the surface of the card substrate. The carrier layer of the transfer ribbon is removed from the bonded imaged transfer layer to complete the transfer of the image to the card substrate. The transfer layer provides protection to the image and the surface of the card substrate.

Heated rollers of conventional card substrate laminating devices have a relatively large circumference relative to the size of the surface of a card substrate, which is conventionally 3.375 inches long by 2.125 inches wide. For example, typical card laminating devices use a heated roller having a circumference of greater than approximately 2.0 inches. As a result, a conventional lamination operation may be performed by the heated roller on a card substrate, which is fed past the heated roller with the short edge leading, by rotating the heated roller less than two times.

Conventional card laminating devices have utilized such large heating rollers because those of ordinary skill in the art believed a high heat capacity roller (e.g., 21 J/° C. per inch of roller length) was necessary to perform satisfactory transfer lamination operations on card substrates, since such rollers would be capable of maintaining a near continuous transfer of heat to the transfer layer during the lamination operation, thereby ensuring uniform heating of the transfer layer. Additionally, the high heat capacity ensures that the temperature of the large heated roller would not change significantly during a transfer lamination operation. This allows the large heated roller to maintain a desired temperature during the performance of multiple lamination operations.

Downsides with the use of the large heated roller are evident during the initial startup of the device, and when it is necessary to process a single card substrate. For example, laminating devices using the large heated roller generally require a long warm-up time before the first card lamination operation can be performed due to the high heat capacity of the large heated roller. Thus, a user may experience significant delays before processing a single card substrate. Additionally, a large amount of energy must be used to initially heat the roller to an operating temperature at which it is capable of performing a card lamination operation, due to its high heat capacity. When only a single card is to be processed, the energy efficiency of the card lamination operation can be quite low.

SUMMARY

Embodiments of the invention are directed to a card substrate laminating device and a method of laminating a card substrate using the device. In some embodiments, the card substrate laminating device includes a transfer ribbon and a transfer roller. The transfer ribbon includes a carrier layer and a transfer layer attached to the carrier layer. The transfer roller is configured to heat and transfer a portion of the transfer layer from the carrier layer to a surface of a card substrate. The transfer roller has a circumference that is less than one half of a length of the card substrate.

In some embodiments of the method, a card substrate is fed along a processing path using a transport mechanism. A portion of a transfer layer of a transfer ribbon is transferred to a surface of the card substrate using a transfer roller by heating the transfer roller, pressing the portion of the transfer layer against the surface of the card substrate using the transfer roller, rotating the transfer roller about a central axis at least two times during the pressing step, and removing a carrier layer of the transfer ribbon from the portion of the transfer layer.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Embodiments of the invention are described more fully hereinafter with reference to the accompanying drawings. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art. Elements that are identified using the same or similar reference characters refer to the same or similar elements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will further be appreciated by one of skill in the art, the present invention may be embodied as methods, systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The invention is also described using flowchart illustrations and block diagrams. It will be understood that each block (of the flowcharts and block diagrams), and combinations of blocks, can be implemented by computer program instructions. These program instructions may be provided to a processor circuit, such as a microprocessor, microcontroller or other processor, such that the instructions which execute on the processor(s) create means for implementing the functions specified in the block or blocks. The computer program instructions may be executed by the processor(s) to cause a series of operational steps to be performed by the processor(s) to produce a computer implemented process such that the instructions which execute on the processor(s) provide steps for implementing the functions specified in the block or blocks.

Accordingly, the blocks support combinations of means for performing the specified functions, combinations of steps for performing the specified functions and program instruction means for performing the specified functions. It will also be understood that each block, and combinations of blocks, can be implemented by special purpose hardware-based systems which perform the specified functions or steps, or combinations of special purpose hardware and computer instructions.

Figure 1:
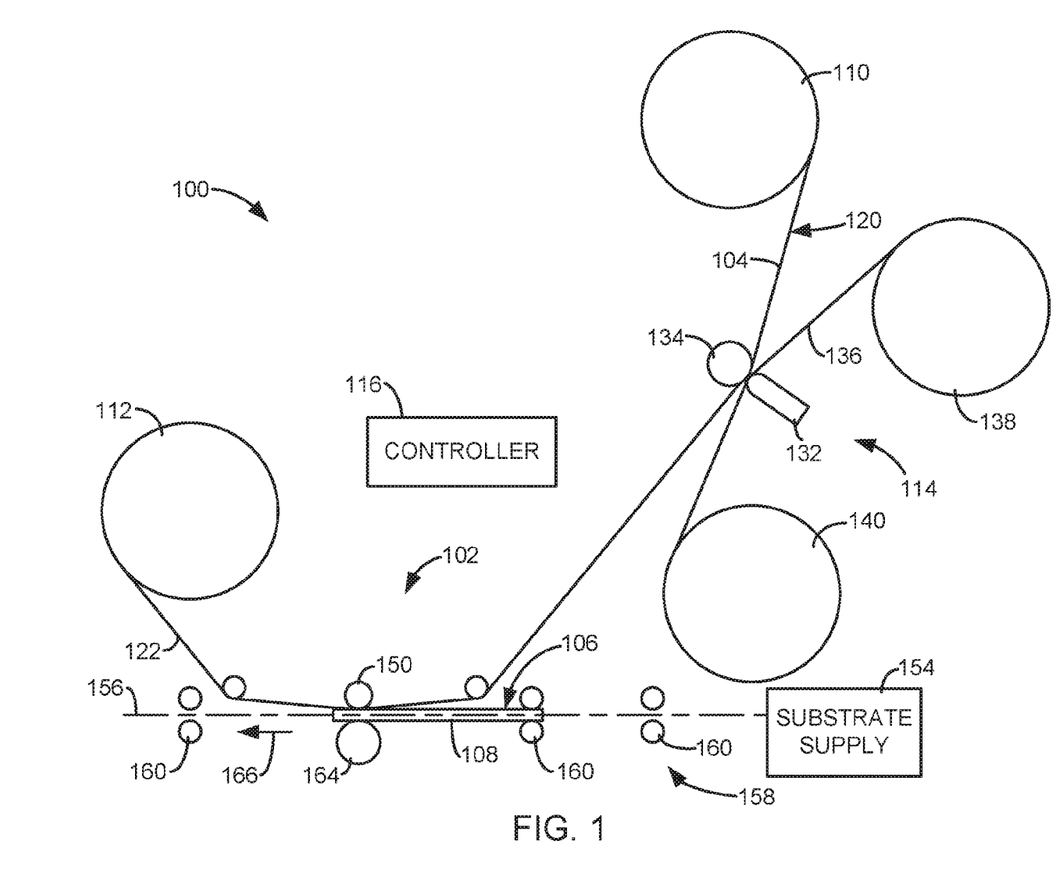
FIG. 1 is a simplified side view of a system in accordance with embodiments of the invention.

FIG. 1 is a simplified side view of a system 100 in accordance with embodiments of the invention. In some embodiments, the system 100 includes a card substrate laminating device 102 formed in accordance with one or more embodiments described herein. The device 102 is configured to apply a transfer layer in the form of a thin film laminate or a patch laminate from a transfer ribbon 104 to a surface 106 of a card substrate 108. In some embodiments, the transfer ribbon 104 is supported between a supply spool 110 and a take-up spool 112.

In some embodiments, the system 100 includes a printing device 114 that is configured to facilitate forming an image on the card substrate 108. In some embodiments, the printing device 114 is configured to directly print an image to the surface 106 of the card substrate 108. In some embodiments, the printing device 114 is configured to print an image to the transfer layer of the transfer ribbon 104, as shown in FIG. 1. The imaged portion of the transfer layer is then transferred to the card substrate 108 by the laminating device 102 to form the image on the card substrate 108.

In some embodiments, the system 100 includes a controller 116, which includes one or more processors. The processors of the controller 116 are configured to execute program instructions, which are stored in local memory of the system 100 or other location, to control components of the device 100 and perform method steps and functions described herein. For instance, the controller 116 controls motors (not shown) that are used to drive the feeding of the transfer ribbon 104 between the supply spool 110 and the take-up spool 112, the feeding of the substrates 108, the feeding of a print ribbon, movement of components of the laminating device 102, and/or movement of components of the printing device 114. The controller 116 also controls the activation of components of the laminating device 102 and the printing device 114.

Figure 2:
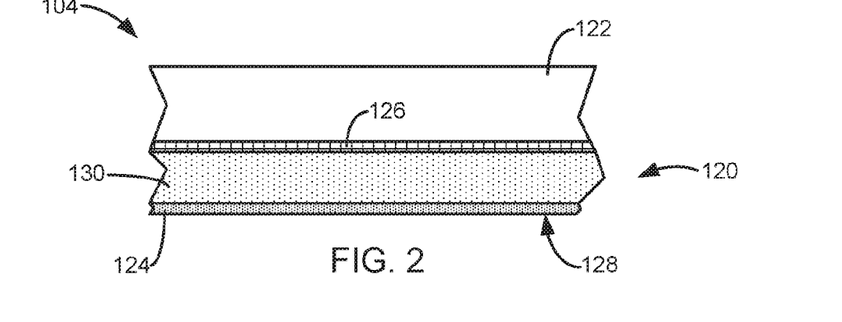
FIG. 2 is a simplified side cross-sectional view of a transfer ribbon having a transfer layer in the form of a thin film laminate, in accordance with exemplary embodiments of the invention.

FIG. 2 is a simplified side cross-sectional view of a transfer ribbon 104 that includes a transfer layer 120 in the form of a thin film laminate or patch laminate, in accordance with exemplary embodiments of the invention. In some embodiments, the transfer layer 120 is attached to a backing or carrier layer 122. In some embodiments, the transfer layer 120 includes a thermal adhesive layer 124, which is activated during a transfer lamination process to bond the transfer layer 120 to a card substrate 108. The transfer ribbon 104 may also include a release layer 126 that assists in releasing the transfer layer 120 from the carrier layer 122 during a transfer lamination process. In some embodiments, such as when the system 100 includes the printing device 114, the transfer layer 120 includes an image receptive surface 128 that is configured to receive a printed image from the printing device 114. Other conventional materials or layers may also be included in the transfer layer 120.

In some embodiments, the transfer layer 120 includes a protective layer 130 located between the adhesive layer 124 and the carrier layer 122. The protective layer 130 operates to provide protection to the surface of the card substrate 108, to which the transfer layer 120 is laminated. In some embodiments, the protective layer 130 may also protect an image printed on the image receptive surface 128. When the transfer layer 120 is in the form of a patch laminate, the protective layer 130 may be a polyester film, for example. When the transfer layer 120 is in the form of a thin film laminate, the protective layer 130 may be a resinous material.

In some embodiments, the printing device 114 includes a print head 132 that is configured to print an image to the surface 106 of the card substrate 108, or to the transfer ribbon 104, such as to the image receptive surface 128 of the transfer layer 120. In some embodiments, the transfer ribbon 104 is supported between the print head 132 and a platen 134, as shown in FIG. 1. In some embodiments, after printing an image to the transfer layer 120 using the print head 132, the imaged portion of the transfer layer 120 is laminated to the surface 106 of the card substrate 108 using the laminating device 102.

In some embodiments, the print head 132 is an inkjet print head. In some embodiments, the print head 132 is a thermal print head that is configured to transfer print material from a print ribbon 136 to the surface 106 of the card substrate 108, or to the surface 128 of the transfer layer 120 (FIG. 1) to form an image thereon, in accordance with conventional techniques. In some embodiments, the print ribbon 136 is supported between a supply spool 138 and a take-up spool 140, as shown in FIG. 1. In some embodiments, the print ribbon 136 includes a plurality of print panels, such as colored dye panels, a black resin panel, and/or other conventional print ribbon print panels.

Figure 3:
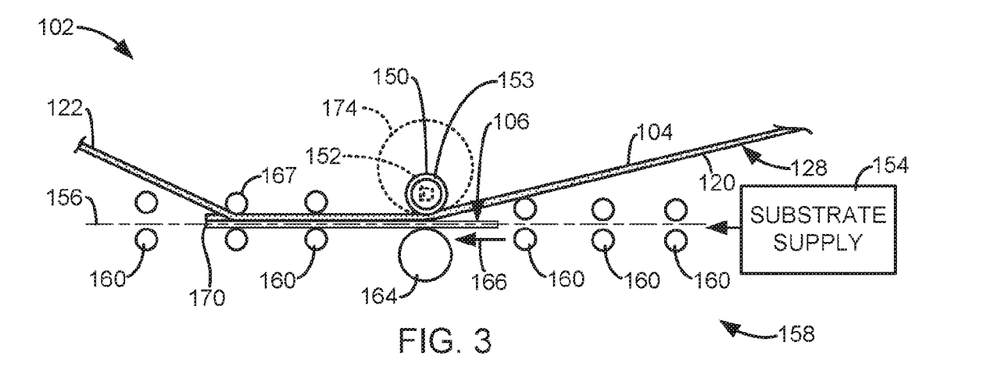
FIG. 3 is a simplified side view of a laminating device in accordance with embodiments of the invention.
Figure 4:
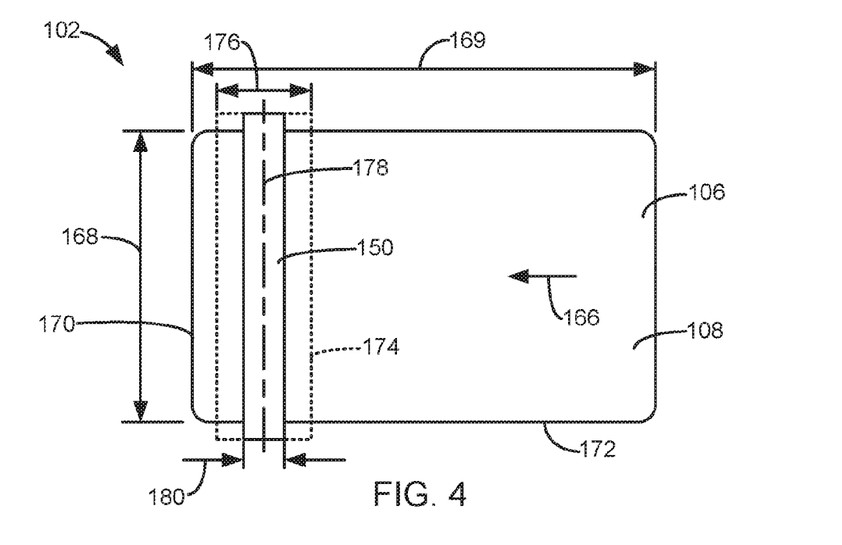
FIGS. 4 and 5 are simplified top views of a laminating device in accordance with embodiments of the invention.
Figure 5:
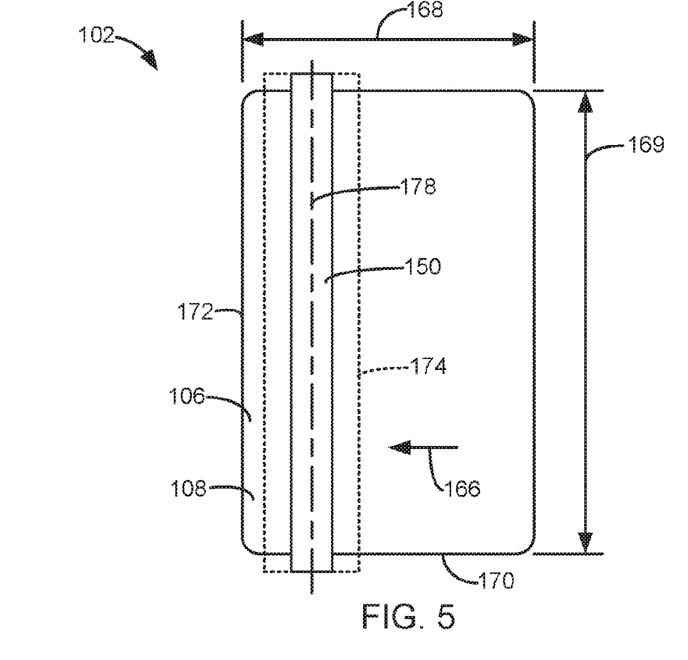
Figure 6:
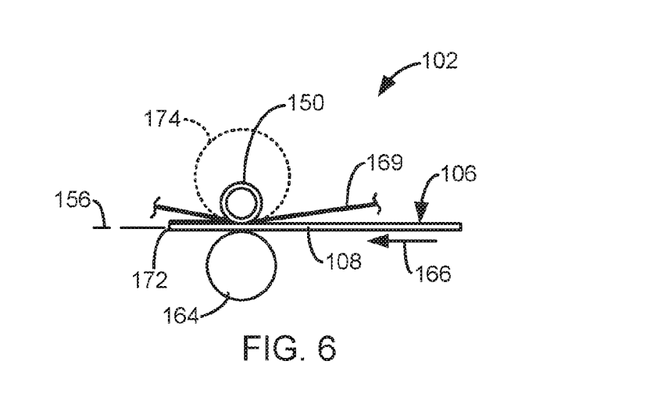
FIG. 6 is a simplified side view of the laminating device of FIG. 5 in accordance with embodiments of the invention.

Some embodiments of the laminating device 102 will be described with reference to FIGS. 3-6. FIG. 3 is a simplified side view of the laminating device 102 in accordance with embodiments of the invention. FIGS. 4 and 5 are simplified top views of the laminating device 102 in accordance with embodiments of the invention. FIG. 6 is a simplified side view of the laminating device 102 of FIG. 5 in accordance with embodiments of the invention.

In some embodiments, the laminating device 102 includes a laminating or transfer roller 150 that includes an internal heating element 152 (FIG. 3), which is configured to heat the transfer roller 150. In some embodiments, the internal heating element 152 is a resistive heating element. In some embodiments, the transfer roller 150 includes a compliant exterior surface 153, such as a silicone rubber coating or layer, as shown in FIG. 3. In some embodiments, the silicone rubber coating is approximately 0.020 inches thick.

In some embodiments, the device 102 includes a substrate supply 154, from which individual card substrates 108 are fed along a processing path 156 past the transfer roller 150 using a transport mechanism 158. In some embodiments, the transport mechanism 158 comprises one or more motorized feed rollers 160, or other suitable mechanism for feeding the substrates 108. Embodiments of the laminating device 102 include sensors (not shown) that may be used to assist the controller 116 in the feeding of the substrates 108 along the processing path 156 with the transport mechanism 158, and aligning the substrates 108 with a transfer section of the transfer layer 120 that is to be laminated to the surface 106 of the substrate 108.

In some embodiments, the transfer ribbon 104 and the substrate 108 are fed between the transfer roller 150 and a platen 164, as shown in FIGS. 3 and 6. As the substrate 108 and the transfer ribbon 104 are fed in a direction indicated by arrow 166 past the transfer roller 150, the heating element 152 heats the transfer roller 150, which heats the transfer ribbon 104 and presses the transfer ribbon 104 against the surface 106 of the card substrate 108. The heating of the transfer ribbon 104 generally activates the thermal adhesive of the transfer layer 120, which bonds the transfer layer 120 to the surface 106 of the card substrate 108. In some embodiments, the carrier layer 122 is pulled from the transfer layer 120 that is bonded to the substrate 108, at a peel-off roller or bar 167, or other suitable component, and is collected by the take-up spool 112. When the transfer layer 120 is in the form of a thin film laminate, the transfer layer 120 that was not placed in contact with the surface 106 of the card substrate 108 remains adhered to the carrier layer 122 following the lamination operation, as indicated in FIG. 3.

The completion of the lamination process leaves the substrate 108 with the transfer layer 120 bonded to the surface 106. An image printed either to the surface 128 of the transfer layer 120, or to the surface 106 of the card substrate 108 prior to the lamination process, is protected by the transfer layer 120.

In some embodiments, the card substrate 108 is a conventional card substrate, such as that used to form identification cards, membership cards, driver's licenses, credit and debit cards, and other similar products. In some embodiments, the card substrate 108 is in the form of a plastic, rigid or semi-rigid card substrate. In some embodiments, the card substrate 108 has a width 168 of 2.125 inches and a length 169 of 3.375 inches, as indicated in the simplified top views of FIGS. 4 and 5.

In some embodiments, the transport mechanism 158 feeds individual card substrates 108 along the processing path 156 with the short edge 170 leading, as shown in FIGS. 3 and 4. In some embodiments, the transport mechanism 158 feeds individual card substrates 108 along the processing path 156 with the long edge 172 leading, as shown in FIGS. 5 and 6.

In some embodiments, the transfer roller 150 has a circumference that is substantially shorter than the circumference of conventional card substrate transfer rollers, such as conventional transfer roller 174 indicated in phantom lines in FIGS. 3-6. As mentioned above, such conventional card substrate transfer rollers 174 are selected to be large in order to provide the desired high heat capacity (e.g., 21 J/° C. per inch of roller length) believed to be necessary to provide satisfactory transfer lamination operations on card substrates 108.

Such conventional card substrate transfer rollers 174 generally rotate less than two times during the performance of a transfer lamination operation on conventional card substrates 108. That is, a circumference of the conventional transfer roller 174 is generally greater than one-half of the length of the conventional card substrate 108. For example, conventional card substrate transfer rollers 174 generally have a diameter 176 of approximately 0.688 inches and a circumference of approximately 2.161 inches. As a result, the conventional transfer roller 174 will undergo approximately 1.56 revolutions about a central axis 178 when laminating a card substrate 108 with the short edge 170 leading (FIG. 4), and the conventional transfer roller 174 will undergo approximately 0.983 revolutions when laminating a card substrate 108 with the long edge 172 leading (FIG. 5). Accordingly, conventional card substrate laminating devices utilizing conventional transfer rollers 174 perform lamination operations on conventional card substrates 108 by rotating significantly less than two times.

In some embodiments, the transfer roller 150 is configured to rotate more than two times during the performance of a transfer lamination operation on a conventional card substrate 108 regardless of whether the substrate 108 is fed with the short edge 170 leading (FIGS. 3 and 4), or with the long edge 172 leading (FIGS. 5 and 6). In some embodiments, the transfer roller 150 has a diameter 180 that is less than 0.388 inches.

In some embodiments, the transfer roller 150 has a heat capacity that is significantly less than the heat capacity of conventional transfer rollers 174. This allows the transfer roller 150 to quickly heat up from an ambient temperature to a laminating temperature, at which a laminating operation can be performed on a card substrate 108. In some embodiments, the heat capacity of the transfer roller 150 is less than 12 J/° C. per inch length. In some embodiments, the heat capacity of the transfer roller 150 is less than 7 J/° C. per inch length. In some embodiments, this relatively low heat capacity of the transfer roller 150 allows the heating element 152 to heat the transfer roller 150 from an ambient temperature (i.e., approximately 20° C.) to a laminating temperature, at which a lamination operation can be performed on a card substrate 108, within 40 seconds.

The relatively low heat capacity of the transfer roller 150 provides significant advantages over conventional high heat capacity (i.e., >21 J/° C. per inch of roller length) card substrate transfer rollers 174. For example, due to the relatively large heat capacity of the conventional card substrate transfer rollers 174, it takes significantly more than 40 seconds to heat up the rollers 174 from the ambient temperature to the laminating temperature. As a result, laminating devices utilizing conventional card substrate transfer rollers 174 require a significant warm-up time before a lamination operation can be performed. In order to avoid such long warm-up times, users may tend to leave such conventional card laminating devices on, resulting in a significant waste of energy. The laminating device 102 having a relatively low heat capacity transfer roller 150, allows users to keep the device 102 off until needed due to the fast warm-up time, thereby eliminating the energy waste associated with the conventional card substrate laminating devices.

Additionally, conventional card substrate transfer rollers 174 require a relatively high amount of energy to raise their temperature from the ambient temperature to the laminating temperature due to their high heat capacity. This further increases the amount of energy that is required to perform a single lamination operation, over that required by the laminating device 102 utilizing the transfer roller 150.

Figure 7:
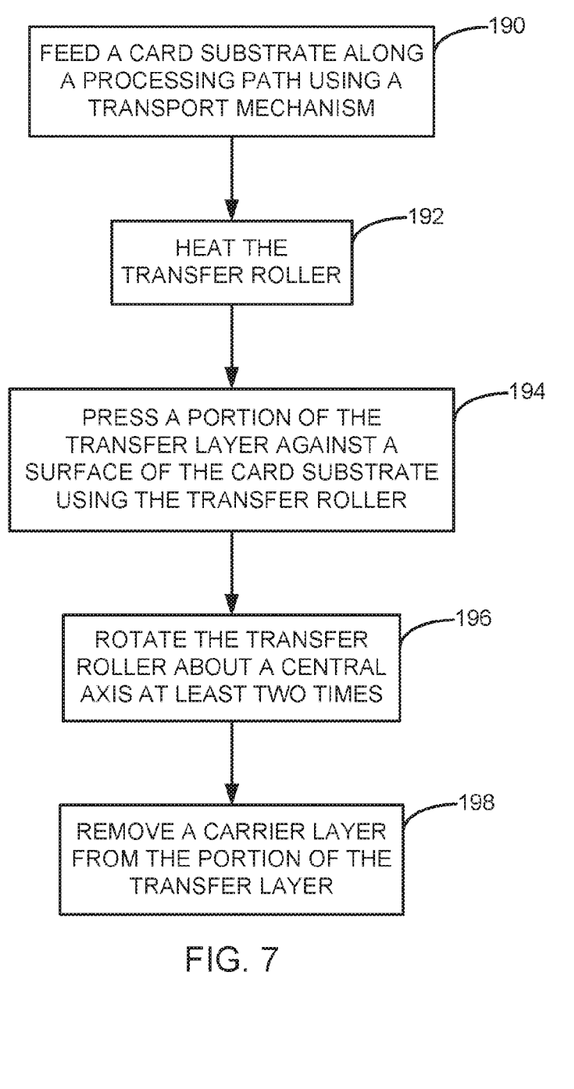
FIG. 7 is a flowchart illustrating a method of laminating a card substrate in accordance with embodiments of the invention.

Some embodiments are directed to a method of laminating a card substrate 108 using the laminating device 102. FIG. 7 is a flowchart illustrating such a method in accordance with embodiments of the invention. At 190, a card substrate 108 is fed along a processing path 156 in the direction 166 using a transport mechanism 158. In some embodiments, the feeding of the card substrate 108 in step 190 is performed with the short edge 170 of the card substrate 108 leading, as shown in FIGS. 3 and 4. In some embodiments of step 190, the card substrate 108 is fed with the long edge 172 leading, as shown in FIGS. 5 and 6.

At 192, the transfer roller 150 is heated. This heating of the transfer roller 150 may occur before and/or during the feeding of the substrate in step 190. In some embodiments, the transfer roller 150 is heated using an internal heating element 152, shown in FIG. 3. In some embodiments of step 192, the transfer roller 150 is heated from an ambient or room temperature to a laminating temperature within 40 seconds.

At 194, a portion (i.e., a patch or a portion of the thin film laminate) of a transfer layer 120 of the transfer ribbon 104 is pressed against a surface 106 of the card substrate 108 using the transfer roller 150, as shown in FIGS. 3 and 6. In some embodiments, step 194 is performed while the transfer roller is at a temperature that is greater than or equal to the laminating temperature. In some embodiments, the transfer layer 120 includes a patch laminate. In some embodiments, the transfer layer 120 includes a fracturable thin film laminate.

At 196, the transfer roller 150 is rotated about the central axis 178 at least two times during the lamination operation (step 194). In some embodiments, the rotation of the transfer roller is driven by the feeding of the card substrate 108 along the processing path 156. In some embodiments, the rotation of the transfer roller 150 is driven by a motor (not shown) under the control of the controller 116. The transfer layer 120 is bonded to the surface 106 of the card substrate 108 in response to the performance of steps 194 and 196.

At 198, a carrier layer 122 of the transfer ribbon 104 is removed from the portion of the transfer layer 120 that was bonded to the surface 106 during steps 194 and 196 to complete the laminating operation on the card substrate 108.

The resultant laminated card substrate 108 includes a transfer layer 120 over the surface 106 of the card substrate 108.

Although the present invention has been described with reference to preferred embodiments, workers skilled in the art will recognize that changes may be made in form and detail without departing from the spirit and scope of the invention.

COPYRIGHT AND LEGAL NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

What is claimed is:

1. A card substrate laminating device comprising a transfer roller configured to heat a portion of a transfer layer of a transfer ribbon and transfer the portion of the transfer layer from a carrier layer of the transfer ribbon to a surface of a card substrate, the transfer roller comprising:
    a diameter of less than 0.537 inches;
    a compliant exterior surface layer or coating; and
    an internal heating element configured to heat the transfer roller from an ambient temperature to a laminating temperature, at which laminating operations are performed, within 40 seconds.

2. The device of claim 1, wherein the transfer roller has a diameter of less than 0.388 inches.

3. The device of claim 1, further comprising a controller and a motor, the controller configured to control the motor to drive feeding of the transfer ribbon between a supply spool and a take-up spool.

4. The device of claim 1, wherein the internal heating element comprises a resistive heating element.

5. The device of claim 4, wherein the compliant exterior surface layer or coating comprises silicone rubber.

6. The device of claim 5, wherein the compliant exterior surface layer or coating comprises a silicone rubber layer or coating that is approximately 0.020 inches thick.

7. The device of claim 3, further comprising a transport mechanism configured to feed the card substrate to the transfer roller with a short edge of the card substrate leading.

8. The device of claim 3, further comprising a transport mechanism configured to feed the card substrate to the transfer roller with a long edge of the card substrate leading.

9. A card substrate laminating device configured to receive a transfer ribbon comprising a carrier layer and a transfer layer attached to the carrier layer, the card substrate laminating device comprising:
    a transfer roller configured to heat a portion of the transfer layer and transfer the portion of the transfer layer from the carrier layer to a surface of a card substrate;
    wherein the transfer roller has a diameter of less than 0.537 inches; and
    wherein the transfer roller includes a heating element that is configured to heat the transfer roller from an ambient temperature to a laminating temperature, at which laminating operations are performed, within 40 seconds.

10. The device of claim 9, wherein the transfer roller has a diameter of less than 0.388 inches.

11. The device of claim 9, further comprising a controller and a motor, the controller configured to control the motor to drive feeding of the transfer ribbon between a supply spool and a take-up spool.

12. The device of claim 11, wherein the heating element comprises a resistive heating element.

13. The device of claim 12, further comprising a transport mechanism configured to feed the card substrate to the transfer roller with a short edge of the card substrate leading.

14. The device of claim 12, further comprising a transport mechanism configured to feed the card substrate to the transfer roller with a long edge of the card substrate leading.

15. A card substrate laminating device comprising a transfer roller configured to heat a portion of a transfer layer of a transfer ribbon and transfer the portion of the transfer layer from a carrier layer of the transfer ribbon to a surface of a card substrate, the transfer roller comprising a circumference of less than 1.6875 inches and a heating element that is configured to heat the transfer roller from an ambient temperature to a laminating temperature, at which laminating operations are performed, within 40 seconds.

16. The device of claim 15, further comprising a controller and a motor, the controller configured to control the motor to drive feeding of the transfer ribbon between a supply spool and a take-up spool.

17. The device of claim 15, wherein the heating element comprises an internal resistive heating element.

* * * * *